Figure 1:
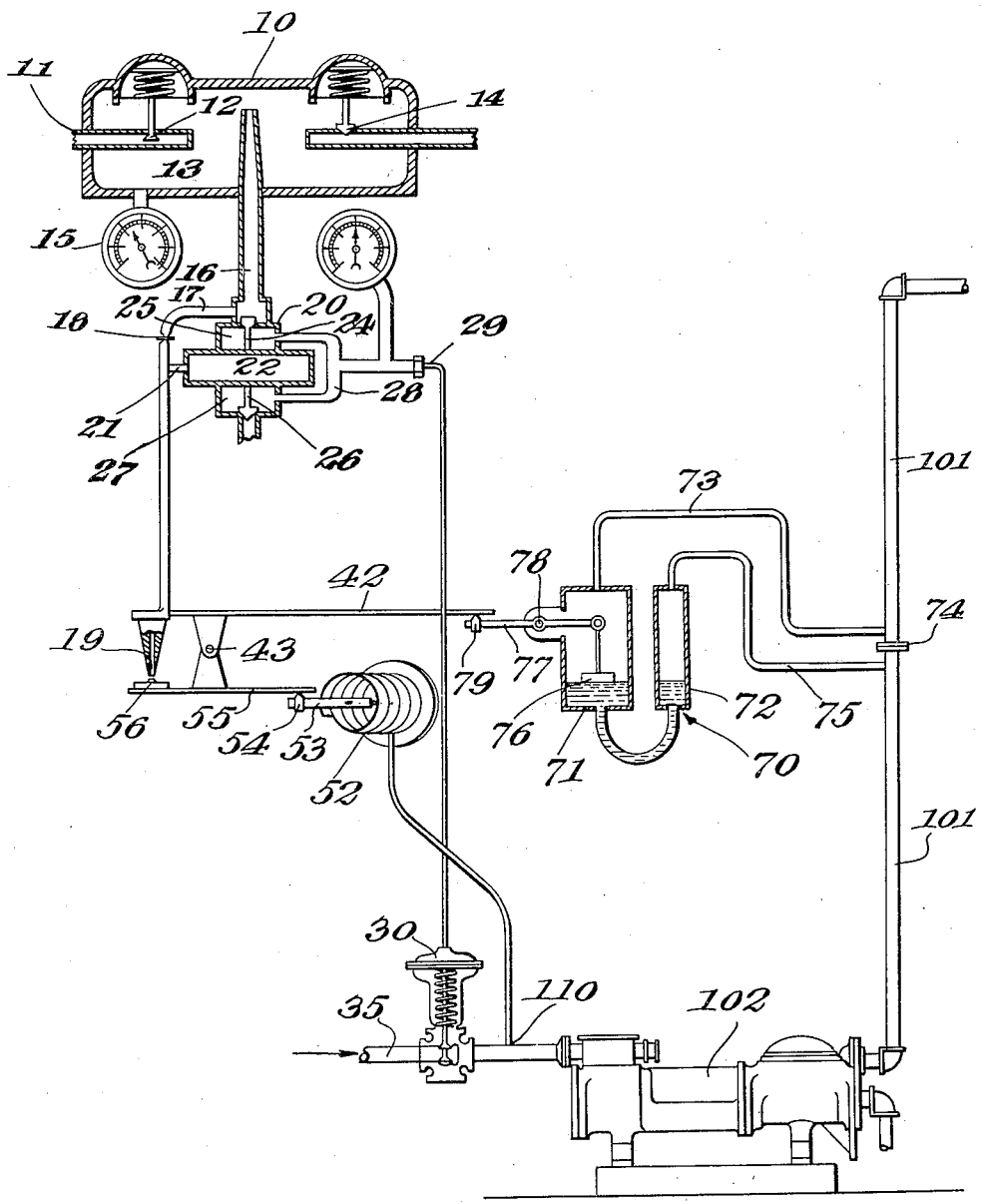

Jan. 8, 1935. E. T. DAHL 1,987,364
CONTROL MECHANISM
Filed Sept. 30, 1932

Inventor:
Edward T. Dahl
By MacLeod Calvin Copeland & Dike
Attorneys.

Patented Jan. 8, 1935

1,987,364

UNITED STATES PATENT OFFICE 1,987,364

CONTROL MECHANISM

Edward T. Dahl, Randolph, Mass., assignor, by mesne assignments, to Eldon Macleod, Westwood, Mass., Frank A. Morrison, Newton, Mass., Cameron Macleod, Berwyn, Pa., Leslie Soule, Dedham, Mass., and Sullivan A. Sargent, Jr., Needham, Mass., trustees, doing business as Mason-Neilan Regulator Company, Boston, Mass.

Application September 30, 1932, Serial No. 635,569

4 Claims. (Cl. 103—12)

This invention relates to control mechanism and more particularly to mechanism for controlling the rate of flow of any fluid medium regardless of changes in characteristics of a source of power operating the mechanical means supplying the fluid medium, or of the discharge pressure.

This invention is a modification and adaptation of the specific principle of control described in my application, Serial No. 635,356, filed September 29, 1932, for Dual control mechanism to which reference is hereby made. The invention herein may be classified as rate of flow control of a fluid medium supplied by mechanical means. This installation is specifically adapted for controlling the rate of flow of any fluid medium which it is desired to supply at a constant rate and the control is secured by controlling the operation of a pump supplying the fluid medium. The fluid herein is supplied through mechanical means, in this case, a pump, preferably operated by steam, and the constant operation of the pump is maintained regardless of changes in the pressure of the steam supplied to the pump. A control valve placed on the steam line to the pump controls the operation of the pump and hence the amount of the fluid medium supplied by the pump. An instrument responsive to rate of flow, such as a mercury manometer, is placed in the fluid supply line leading from the pump and, since much of the fluctuation in rate of flow of the fluid being supplied has been discovered to be due to previous fluctuations in the pressure of the steam operating the pump, a pressure responsive device is placed in the steam line below the control valve. The instruments responsive to rate of flow and to pressure then operate through their resultant action to control the supply of fluid medium through the pump by operating on the control valve on the steam line to the pump, through an independent pressure system. By this dual control a much more accurate rate of flow control is obtained over the fluid medium being supplied than in previous installations which control by the use of the rate of flow instrument alone placed in the fluid medium supply line from the pump.

Before explaining in detail the present invention, it is to be understood that the invention is not limited in its application to the details of construction and arrangement of parts illustrated in the accompanying drawing, since the invention is capable of other embodiments and of being practiced or carried out in various ways. Also it is to be understood that the phraseology or terminology employed herein is for the purpose of description and not of limitation, and it is not intended to limit the invention claimed herein beyond the requirements of the prior art.

In the drawing:

The figure is a diagrammatic view of my dual control mechanism as adapted for rate of flow control of a fluid medium supplied by mechanical means.

Since the invention herein comprises a specific adaptation to a rate of flow control of a fluid medium supplied by mechanical means of the mechanism fully disclosed and described in my application Serial No. 635,356, filed September 29, 1932, previously referred to, it is unnecessary to repeat the description of the parts common to the two inventions. For a complete description of the construction and operation of my dual control mechanism, reference is made to the aforementioned application.

10 represents the mechanism for maintaining an adequate and constant pressure of air for operating the independent pressure system which in turn operates the control valve on the steam supply line to the pump. The air is supplied through pipe 11 and passes into the reservoir 13 through reducing valve 12, which is preferably set for 15 pounds pressure. A safety relief valve 14 is likewise provided in the mechanism 10, again preferably set for 15 pounds pressure and if pressure in the reservoir 13 exceeds 15 pounds as indicated by gauge 15 the relief valve 14 opens and permits air to escape until the pressure is reduced. The air from reservoir 13 passes down the pipe 16 leading to a diaphragm mechanism 20 of the type described in Annin application Serial No. 463,034 and a flexible branch pipe 17 having a fixed orifice 18 bypasses the stream of air. The independent pressure system ordinarily exhausts to the atmosphere through the exhaust orifice 19, but as controlled by the flapper 56 actuated by the pressure from the steam line to the pump, the independent pressure is diverted through the relay mechanism 20 to the control valve 30 on the steam supply line 35.

Branch pipe 17 connects with the relay mechanism 20 through pipe 21 below the fixed orifice 18 which leads into a central diaphragm chamber 22. A stem 24 abutting the top side of the diaphragm chamber 22 forms a valve between pipe 16 and chamber 25. A similar stem 26 abutting the bottom side of the diaphragm chamber 22 forms an exhaust valve between the chamber 27 and the atmosphere. Both chambers are connected on the outside by pipe 28 which leads through pipe 29 to the control valve 30. A gauge 31 is connected to pipe 29 and records the pressure in said pipe. Control valve 30, which is preferably a diaphragm motor valve, controls the admission of steam or other heating medium to the heating tank 36.

On the closing of exhaust orifice 19, pressure in diaphragm chamber 22 builds up, forcing valve 26 closed and valve 24 open, allowing pressure from pipe 16 to enter directly into chamber 25, flow through connecting pipe 28 into chamber 27 and equalize the pressures therein. When pressure in chamber 25 balances the force in central chamber 22, valve 24 closes to prevent pressure in 25 from increasing. Air then flows through pipes 28 and 29 to control valve 30, the pressure of which on the diaphragm 30a opens the valve 30 and permits the steam to flow to the pump 102. Valve 30 as here shown opens on movement down.

The fluid medium whose rate of flow it is sought to control, discharges through pipe 101 and is supplied by means of the pump 102, preferably steam-operated through the steam supply line 35, although it is understood that any other suitable source of power for operating the pump may be substituted. Pump 102 is constructed in any suitable manner as well known in the art and its construction is not a part of the invention herein.

A rate of flow responsive instrument 70, such as a mercury manometer, is connected in the fluid medium supply line 101 below the pump. The mercury manometer is of well known construction having two pots 71 and 72 containing mercury and connected at their bottoms, the pot 71 in turn being connected by pipe 73 to the downstream side of an orifice plate 74 placed in the fluid medium supply line 101. The pot 72 is likewise connected by a pipe 75 on the upstream side of the orifice plate 74 on the fluid medium supply line. A float 76 is arranged in the pot 71 and is attached to one end of an arm 77 fulcrumed at 78 and having a sliding wedge 79 on the other end and placed in abutting relation to the lever 42 which is itself fulcrumed at 43. It is to be assumed that pivot 78 is on a shaft journalled in a stuffing box attached to the mercury pot 71 and sealed from atmospheric pressure. A control valve 30 is placed on the steam line 35 leading to the pump 102 and is preferably of a diaphragm motor type and is operated by the independent pressure system previously referred to. A pressure responsive instrument 110 (which may be a connection which transmits the original pressure of the steam) is placed in the steam supply line 35 between the control valve 30 and the pump 102 and leads to the helical pressure coil 52, Bourdon tube or other pressure responsive device. The coil 52 is rigidly mounted at one end and has rigidly attached at its other end an arm 53 with sliding wedge 54 thereon in abutting relation to lever 55 also fulcrumed at point 43. At the further end of lever 55 is attached the flapper 56 for closing the exhaust orifice 19. It is to be understood that the drawing shown here is diagrammatic and that the operative structure of the entire relay mechanism controlling the operating pressure is illustrated in Fig. 2 of the drawing of my application Serial No. 635,356 previously referred to. For the purpose of understanding the present invention it may be assumed that pipe 17 leading to the exhaust orifice 19 is flexible and therefore movable.

The device operates in the same manner as that described in my application Serial No. 635,356, above referred to. An increase in the rate of flow of the fluid medium being supplied through the pipe 101 is transmitted through mercury manometer 70 and this in turn causes the float 76 in pot 71 to rise and acting through arm 77 and lever 42, orifice 19 rises partially opening orifice 19. This allows relay mechanism 20 to partially close control valve 30, thereby diminishing the amount of steam for operating the pump 102 and consequently reducing the rate of flow of the supplied medium. On a decrease in the rate of flow of the fluid medium the action of the instruments is opposite. Since fluctuations in the pressure in the steam supply line 35 will affect the operation of the pump 102 and consequently the rate of flow of the medium being supplied, these fluctuations are also compensated for by operation of the control valve through the independent pressure system. With an increase in pressure in steam supply line 35 which will accelerate the operation of the pump 102, this increase in pressure is transmitted through pressure responsive instrument 110 to unwind pressure coil 52 which acts through the inner connecting levers to move flapper 56 away from orifice 19 thereby partially opening the exhaust valve. Control valve 30 then closes partially and operates to decrease the amount of steam supplied to the pump 102, and consequently lessens the rate of flow of the fluid medium supplied by the pump. On a decrease in pressure in steam supply line 35 the action of the apparatus is opposite.

By means of my invention changes in the rate of flow of the fluid medium are anticipated and fluctuations in the steam supply line operating the pump are compensated for through the independent pressure system operating on the control valve 30, before these fluctuations have affected the rate of flow of the fluid medium being supplied. In this way the rate of flow of the fluid medium is held constant regardless of any changes in characteristics of the source of power operating the pump supplying the fluid medium. The supply of the fluid medium is governed therefore by the joint and resultant action of the two instruments, one responsive to changes in rate of flow of the fluid being supplied and the other responsive to changes in pressure of the steam supply operating the pump and supplying the fluid medium. In this way a much more accurate control of the rate of flow of any fluid medium being supplied is secured, which is highly important in any situation where an accurate constant rate of flow of a fluid medium is desirable or essential.

I claim:

1. An apparatus for controlling the supply of a fluid medium, comprising a steam-operated pump for supplying said medium, a source of steam supply for operating the pump, a control valve on the steam supply line controlling the supply of steam to said pump, a relay mechanism utilizing an independent source of pressure for operating said control valve and ordinarily exhausting to the atmosphere, an exhaust valve governing the exhaust from said mechanism, having an orifice and flapper, levers for moving said orifice and flapper toward and away from each other about a common axis and so operating said exhaust valve, a manometer responsive to the rate of flow of the supplied medium, an instrument responsive to the pressure of the steam supplied to the pump, a float actuated by the manometer for moving the orifice lever, a coil actuated by the pressure responsive instrument for moving the flapper lever and so actuating the exhaust valve of the independent pressure system through the resultant action of said instruments.

2. An apparatus for controlling the supply of a fluid medium, comprising a steam-operated pump for supplying said medium, a source of steam supply for operating the pump, a control valve on the steam supply line controlling the supply of steam to said pump, a relay mechanism utilizing an independent source of pressure for operating said control valve and ordinarily exhausting to the atmosphere, an exhaust valve governing the exhaust of said pressure to the atmosphere including an orifice and flapper, a supply and waste valve in said relay mechanism for supplying and wasting pressure to and from said control valve, a diaphragm chamber in said relay mechanism acted on by said pressure for actuating said supply and waste valve, levers for moving said orifice and flapper toward and away from each other about a common axis and so operating said exhaust valve, a manometer responsive to the rate of flow of the supplied medium, an instrument responsive to the pressure of the steam supplied to the pump, a float actuated by the manometer for moving the orifice lever, and a coil actuated by the pressure responsive instrument for moving the flapper lever and so actuating the exhaust valve of the independent pressure system through the resultant action of said instruments.

3. An apparatus for controlling the supply of a fluid medium, comprising a steam operated pump for supplying said medium, a source of steam supply for operating the pump, a control valve on the steam supply line controlling the supply of steam to said pump, a pilot mechanism utilizing an independent source of pressure for operating said control valve and ordinarily exhausting to the atmosphere, an exhaust valve governing the exhaust of said pressure to the atmosphere, said pilot mechanism including a casing, a pair of diaphragms dividing said casing into two outer chambers and an inner chamber, a supply valve and a waste valve in said outer chambers governing the supply of said pressure in said system, said pressure expanding said inner chamber and actuating said supply and waste valves to divert said pressure to the control valve for operating the same on the closing of said exhaust valve, and joint means responsive to the resultant effect of the rate of flow of the supplied medium and the pressure of the steam supplied to the pump for actuating said exhaust valve.

4. An apparatus for controlling the supply of a fluid medium, comprising a steam-operated pump for supplying said medium, a source of steam supply for operating the pump, a control valve on the steam supply line controlling the supply of steam to said pump, a pilot mechanism utilizing an independent source of pressure for operating said control valve and ordinarily exhausting to the atmosphere, an exhaust valve governing the exhaust of said pressure to the atmosphere, said pilot mechanism including a casing, a pair of diaphragms dividing said casing into two outer chambers and an inner chamber, a supply valve and a waste valve in said outer chambers governing the supply of said pressure in said system, said pressure expanding said inner chamber and actuating said supply and waste valves to divert said pressure to the control valve for operating the same on the closing of said exhaust valve, an instrument responsive to the rate of flow of the supplied medium, another instrument responsive to the pressure of the steam supplied to the pump, and joint means operated by the resultant action of said instruments for actuating the exhaust valve of the pilot mechanism.

EDWARD T. DAHL.